UNITED STATES PATENT OFFICE.

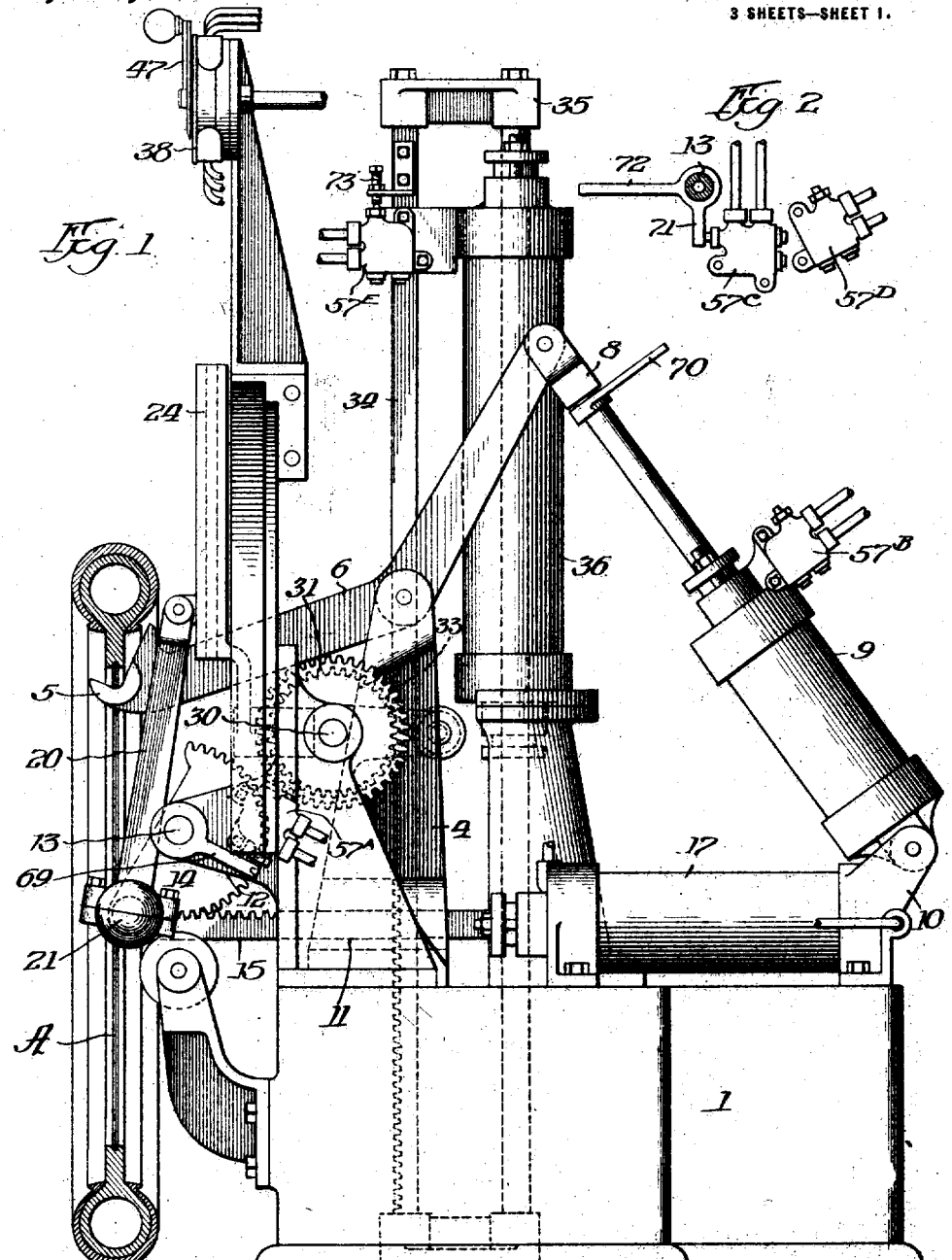

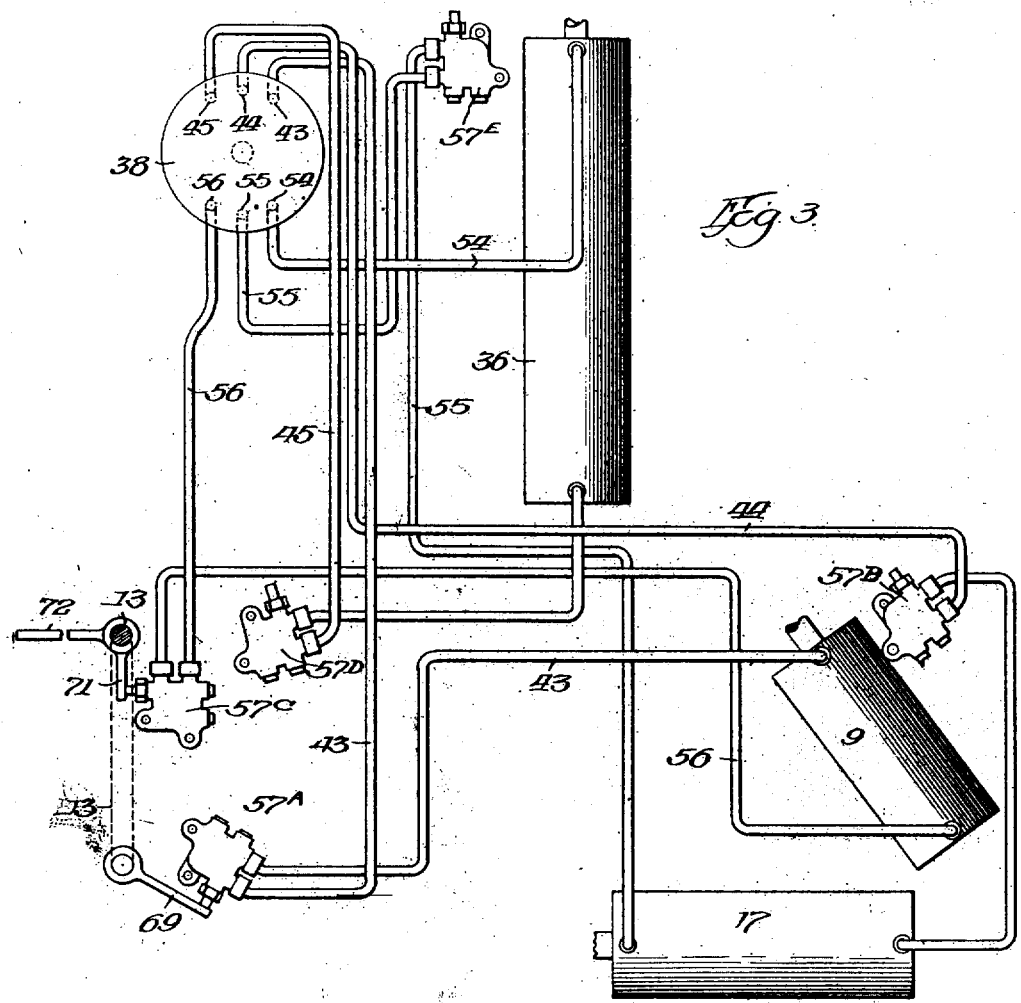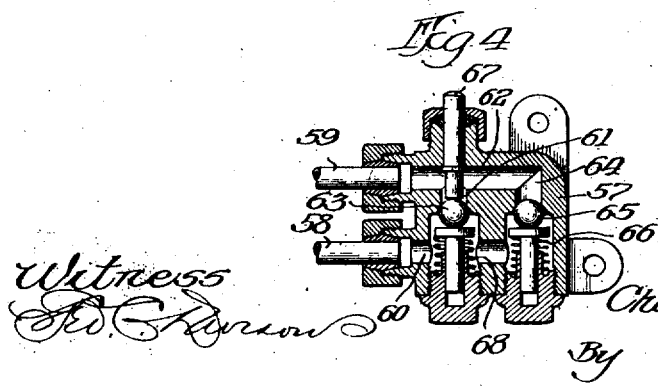

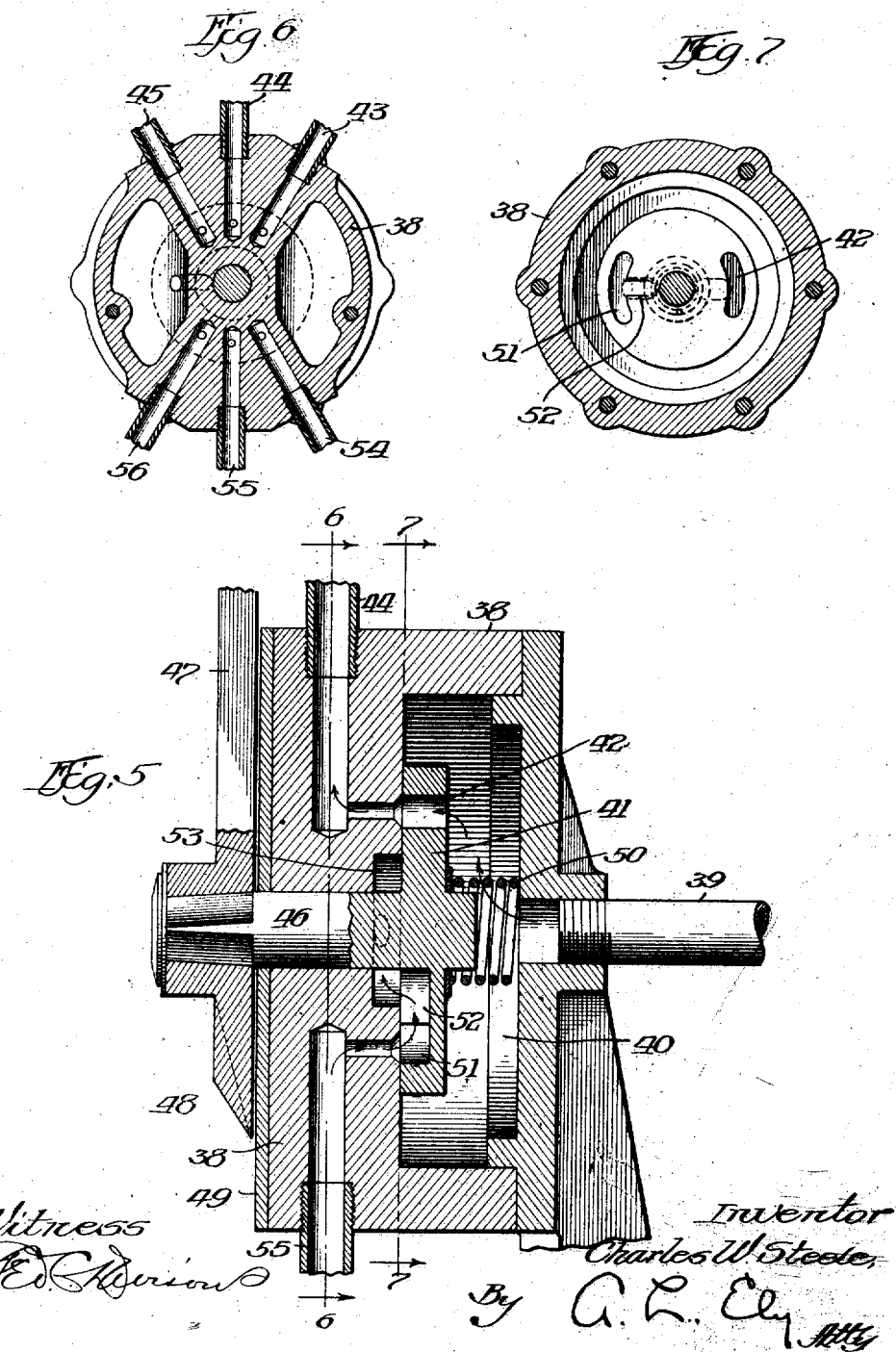

CHARLES W. STEELE, OF AKRON, OHIO, ASSIGNOR TO THE FIRESTONE TIRE & RUBBER COMPANY, OF AKRON, OHIO, A CORPORATION OF OHIO.

TIRE-STRIPPING MACHINE.

1,258,717.   Specification of Letters Patent.   Patented Mar. 12, 1918.

Application filed October 31, 1917.   Serial No. 199,597.

*To all whom it may concern:*

Be it known that I, CHARLES W. STEELE, a citizen of the United States, residing at Akron, in the county of Summit, State of Ohio, have invented certain new and useful Improvements in Tire-Stripping Machines, of which the following is a specification.

The purpose of this invention is to improve on that type of machine which was invented by William C. Stevens and patented January 2, 1917, No. 1,211,256, to which reference should be made. It has been the object of this invention to improve the valve operating mechanism so that when the operation of stripping a tire is started it could follow automatically without requiring further attention on the part of the operator. It is also an object to so construct the machine that it will be impossible for one operation to commence until the one preceding it has been completed. Thus the machine of the Stevens patent is made nearly automatic and also fool-proof.

These and other objects will appear as the description proceeds. In the drawings:

Figure 1 is a side elevation of a tire stripping machine before the beginning of the stripping operation, a core being shown, in section, in position to be clamped in place.

Fig. 2 is a detail of the valve-control on the opposite side of the actuating shaft from that shown in Fig. 1.

Fig. 3 is a diagrammatic view of the piping between the several cylinders showing the arrangement of the various control-valves.

Fig. 4 is a cross section through one of the control-valves.

Fig. 5 is a section through the operating valve.

Fig. 6 is a cross section through the operating valve in the line 6—6 of Fig. 5.

Fig. 7 is a cross section on the line 7—7 of Fig. 5.

The tire stripping machine shown in the Stevens patent, above referred to, has three distinct operations in the removal of a tire. The first operation is the clamping of the core in position in front of the machine. The second is the radial extension of the arms carrying the stripping members. And the third is the circumferential movement of the arms about the core which removes the tire. For each of these operations there is provided a separate fluid operated cylinder, each cylinder being connected by suitable piping with a central operating valve, there being interposed in the connection with each cylinder a control valve which is opened on completion of the operation just preceding the one which is performed by its particular cylinder.

The machine comprises a base 1 on the upper surface of which is secured a vertical standard 4. In the upper end of the standard is pivotally mounted a rocking arm 6 carrying at its outer end a moving grip or clamp 5, which is raised to clamp the core A in position. The rear end of the core-clamping arm is pivoted to the plunger 8 of a fluid operated cylinder 9, which is in turn pivoted on a bracket 10 at the rear of the base. When the cylinder 9 is charged with its operating fluid, preferably air, the plunger will be withdrawn, the outer end of the arm raised and the core clamped into position. This is the first movement of the machine.

The base of the machine is formed with an integral web 11 from which extends a pair of parallel brackets, one of which is shown at 12, in the outer ends of which is rotatably mounted a shaft 13, which may be described as the valve actuating shaft. This shaft carries a segmental gear 14, the teeth of which are in mesh with a horizontal reciprocating rack 15 carried by the plunger of the second fluid operated cylinder 17. The extremity of the gear segment carries, by means of a ball and socket joint 21, a pair of tire stripping arms 20 which carry at their extremities suitable tire removing fingers or rollers. As fluid pressure is admitted to the cylinder 17 the rack 15 is moved forward rocking the gear segment which advances the stripping arms 20 radially of the core along guideways 24. This is the second movement of the machine.

The third and last movement is the spreading of the arms, or their movement over the core which serves to peel the tire from the core. This action will be better understood by reference to the Stevens patent. For the purpose of the present application it will be sufficient to state that the arms or guides 24 are carried on arcuate racks formed with gear teeth on their rear surfaces which engage bevel gears 31 carried on a transverse shaft 30. The shaft 30 carries a pinion 33 which meshes with a vertical rack carried by a cross head 35 operated by a third cylinder 36. As the piston in the cylinder is raised the arms 20 are separated and moved from their vertical position, around the core, and strip the tire.

The operation of the various cylinders is controlled by the single operating valve, which is designated by the numeral 38, is mounted on the front of the machine and is shown in Figs. 5, 6 and 7 of the drawings.

Fluid under pressure is supplied to the machine by a main supply pipe 39 which delivers into a valve chamber 40 at the back of the valve 38. On the side of the chamber opposite the supply pipe there is carried a movable valve plate 41, through which passes an arcuate slot 42, arranged to allow fluid under pressure to pass from the chamber 40 into the three pressure inlet pipes, 43, 44, 45. The valve plate 41 is carried on a stem 46 rotatably mounted in the valve casing, the stem extending beyond the front of the valve and carrying a handle 47, provided with a pointer 48 traveling over a marked disk 49 on the front of the valve casing. A spring 50 is arranged in the valve chamber and serves to hold the valve plate against the front of the valve chamber. The valve plate is also provided with an arcuate groove 51 extending from the front face of the plate to a little over half its depth, which groove communicates with a radial groove 52 adapted to register with an exhaust chamber 53. The arcuate groove 51 may be brought over any one or all of the pipes 54, 55 or 56. During the stripping of the tire the fluid pressure is introduced into the various operating cylinders through the chamber 40 and the pipes 43, 44 and 45, while the opposite sides of the cylinders are in communication with the atmosphere through the pipes 54, 55 and 56 and the passages 51, 52, and exhaust chamber 53.

In each of the pipes from the main operating valve 38 to the various cylinders there is arranged a control valve, which is shown in detail in Fig. 4. The control valve is designated as a whole by the numeral 57 and is provided with passage 58 and passage 59. The passage 58 communicates with a chamber 60 at one side of which is a passage 61 leading to the passage 62. A ball-valve 63 is arranged normally to close the passage 61. A by-pass 64 is also arranged in the valve casing which is normally closed by a ball-valve 65. It will be noted that the spring 66 which holds the valve 65 closed is comparatively light so that in case of leak in any line the pressure may be kept up through the by-pass. A valve pin 67 is slidably mounted in the casing and rests on the valve 63, the valve being sustained by a heavier spring 68.

There are five of these valve casings located in the piping, as will be seen from an examination of Fig. 3. These valve casings are designated in rotation $57^A$, $57^B$, $57^C$, $57^D$ and $57^E$. Each valve pin of the valve is arranged to be engaged by a tappet on one of the operating parts of the machine. The pin of the valve $57^A$ is held depressed or open by a tappet arm 69 located on the actuating shaft 13 when the arms 20 are at their lowermost point of travel, as shown in Fig. 1. The valve pin of the valve $57^B$ normally stands with the valve closed, but it is arranged to be engaged by a tappet arm 70 on the end of the plunger 8, so that when the arm 6 is rocked to the limit of its movement and the core clamped in position the valve $57^B$ will be opened. The pin of the valve $57^C$ is normally held open by a tappet arm 71 carried on the shaft 13 when the shaft is in the position shown in Fig. 1. The valve pin of the valve $57^D$ is normally closed but is arranged to be engaged and opened by the tappet arm 72, also mounted on the shaft 13, when the gear segment is rocked to bring the arms 20 to the upward limit of their travel. The pin of the valve $57^E$ is normally held open by a tappet 73 located on the rack 34 and arranged to engage the pin of this valve when down or in its normal position. The valve $57^A$ is located in the line of the pipe 43 which leads from the operating valve to the cylinder 9. The valve $57^B$ is located in the pipe 44 that leads to the cylinder 17. $57^C$ is located in pipe 56, $57^D$ in pipe 45 and $57^E$ in pipe 55.

The operation of the parts will be best understood from a description of the manner in which a tire is stripped in this machine. A core with a tire having been placed in the position shown in Fig. 1, the operator may move the handle 47 to place the pipe 43 only in communication with the pressure supply, and thus around one step at a time, but it is possible to move the handle around to the limit, placing all of the pipes 43, 44 and 45 in communication with the pressure line, and all of the pipes 54, 55 and 56 in communication with the exhaust, whereupon, because of the arrangement of control valves the operations will follow in regular sequence. Assuming that the handle has been moved to the limit of its throw, the pipe 43 is open direct to the cylinder 9, the valve $57^A$ being held open by the tappet 69, as explained. The pipe 44 is closed by the valve $57^B$ and the pipe 45 by valve $57^D$. In like manner the pipe 56 leading to the opposite end of the cylinder 9 is open to the exhaust through the valve $57^C$, which is held open by the tappet 71, and the pipe 55 is open through the valve $57^E$, held by the tappet 73. Air under pressure being admitted to the upper end of the cylinder 9, the rocker arm 6 is raised and the core clamped in position. At the downward limit of movement of the plunger 8 the tappet 70 strikes the pin of the valve 57$^B$ which opens communication between the source of pressure and the rear end of the cylinder 17 through the pipe 44, the opposite end of which is open to the exhaust through pipe 55 and valve 57$^E$. As the rack 15 advances the shaft 13 is rocked, the first effect of which is to close the valve 57$^A$ by removal of the tappet 69, effectively locking air in the cylinder 9, and the closing of the valve 57$^C$ which closes the pipe 56 to the exhaust, thereby insuring that the core will remain elevated during the stripping of the tire.

As the rack 15 continues its forward movement the arms 20 move outwardly radially and when they have reached the highest point the tappet 72 strikes the pin of the valve 57$^D$ opening the valve and admitting pressure through the pipe 45 to the lower end of the cylinder 36, which operates the rack 34 to perform the third and last operation in the stripping, the circumferential or spreading movement of the arms. The first effect of the upward movement of the rack is to lift the tappet 73 from the valve-pin of valve 57$^E$, which closes the pipe 55 to the exhaust and holds the rack 15 at the outward limit of its travel. In the movement of the rack 34 the pipe 54 connecting the upper end of the cylinder with the exhaust is always open.

When the rack 34 is at the upward limit of its movement the tire is stripped and may be removed from the core. The operator now turns the handle 47 through 180 degrees, throwing all of the lines 43, 44 and 45 in communication with the exhaust and all of the lines 54, 55 and 56 in communication with the pressure supply. At this state of the machine, however, the only line open to the pressure is pipe 54, valve 57$^E$ closing line 55 and valve 57$^C$ closing line 56. Of the now exhaust lines pipe 45, connecting the lower end of cylinder 36 with the valve 38, is open. Pressure is now admitted to the cylinder 36 above the piston and the rack descends, pressure on the opposite side of the piston being released through pipe 45 and valve 57$^D$. When the rack 34 reaches its lowermost point the tappet 73 opens the valve 57$^E$ and pressure passes through the pipe 55 to the front end of the cylinder 17 and the rack 15 is withdrawn, pressure passing from the rear end through the pipe 44 and valve 57$^B$ to the exhaust. As the shaft 13 revolves on the withdrawal of the rack 15 the tappet 72 is removed from the valve pin of valve 57$^D$ which closes the line 45 to the exhaust and locks the rack 34 in its lowermost position. At the limit of the withdrawal of the rack 15, which moves the arms 20 back to their normal position, the tappet 71 strikes the pin of valve 57$^C$ and tappet 69 the pin of valve 57$^A$. Valve 57$^C$ being open, pressure passes along line 56 to the rear of the cylinder 9 and the line 43 is open to the exhaust through valve 57$^A$. The first upward movement of the arm 6 removes the tappet 70 from the valve 57$^B$, closing the rear of the cylinder 17 to the exhaust by way of pipe 44. The empty core is now lowered on the floor and the machine is in condition to receive another core.

It will be noted that by this improved system of control valves and tappets therefore, I have made the machine of the Stevens patent absolutely safe and nearly automatic. It is unnecessary for the operator to watch each operation and move the valve at the end of each movement, although it is possible to stop the operation of the machine at any point. Also, there is no danger of one operation taking place before the next preceding operation is finished. This improvement may broadly be said to consist in the provision of a series of interlocking valve mechanisms on the tire stripping machine.

While I have shown the valve which is described in detail and illustrated in Fig. 4, such valve is not essential in all of the positions, it being practicable to substitute a one-way valve in all of the positions except 57$^A$, where such a valve is necessary owing to the possibility of leakage allowing the core to be lowered.

I claim:

1. The combination of a tire-stripping machine, comprising a core clamping device and means to stretch the bead of the tire over the core, of mechanism adapted to insure that the operations follow in sequence.

2. The combination with a tire-stripping machine, wherein the tire-stripping operations take place in sequence, of mechanism for controlling each operation, and in turn controlled by the completion of the operation next preceding, whereby it is insured that the operations will take place in sequence.

3. The combination with a tire-stripping machine, wherein the tire-stripping operations take place in sequence, and fluid operated mechanisms for carrying out said operations of control valves for said mechanisms, and means actuated by said operations for governing said control valves.

4. The combination with a tire-stripping machine, comprising means for holding a core of fluid operated mechanism for said core-holding means, a control valve for said fluid operated mechanism, and means governed by the next following operation of the tire stripping machine for locking said control valve.

5. The combination with a tire-stripping machine, comprising means for holding a core, a control for maintaining said core-holding means in clamping position, and means governed by the next following operation of the stripping machine for locking said control.

6. The combination with a tire-stripping machine, comprising a core clamping device and tire stripping member, of means for actuating said clamping device, and means for moving said tire stripping member over the surface of the core, a control for said actuating means and a device on said means for moving said tire stripping member adapted to operate said control.

7. The combination with a tire-stripping machine, comprising a core clamping device and tire stripping members, of fluid actuated means for operating said clamping device, and fluid actuated means for moving said tire stripping members over the surface of the core, a source of fluid pressure, a valve between said source of pressure and said means for operating said clamping device, an arm carried by said tire stripping members normally maintaining said valve open, but movable to close said valve when movement of said stripping members commences.

8. The combination with a tire stripping machine, comprising a core clamping device and tire-stripping members, of fluid actuated means for operating said clamping device and fluid actuated means for moving said tire stripping members over the surface of the core, a source of fluid pressure, a normally closed valve between said source of pressure and said means for moving said tire stripping members, and an arm carried by said clamping device and movable to open said valve upon completion of the movement of the said core-clamp-device.

9. The combination with a tire-stripping machine, comprising tire stripping members, means to advance said members radially of the core and means to move said members about the periphery of the core, of a control device actuated by said first mentioned means, permitting said second means to operate upon completion of the radial movement of the tire stripping members.

10. The combination with a tire-stripping machine, comprising tire stripping members, of a fluid actuated device to advance said members radially of the core and a second fluid actuated device to move said members about the periphery of the core, a source of fluid pressure, a normally closed valve between said source of fluid pressure and said second named fluid actuated device, and an arm operable upon completion of the radial movement of said stripping members to open said valve.

11. The combination with a tire-stripping machine, comprising a core-clamping device and tire-stripping members, means to move said core-clamping device and said tire stripping members, a control device operated upon completion of the tire stripping movement, permitting said means for moving said core-clamping device to release said core.

12. The combination with a tire-stripping machine, comprising a core-clamping device and tire stripping members, of a fluid actuated device to operate said tire stripping members and a second fluid actuated device to operate said core-clamping device, a source of fluid pressure, a valve between said source of pressure and said second-named fluid actuated device, said valve being closed during the operation of said stripping members and an arm operable upon completion of said stripping operations to open said valve to admit fluid pressure to move said clamping means to release said core.

13. The combination with a tire-stripping machine, comprising tire-stripping members, means to move said members radially of the core and to move said members about the periphery of the core, and means controlled by the periphery movement of the stripping members, whereby radial movement of the members may not take place during the peripheral movement.

14. The combination with a tire-stripping machine, of a tire stripping member, fluid actuated means to move said member radially of the core and second fluid actuated means to move said member about the periphery of the core, a source of fluid pressure, a valve between said source of fluid pressure and said first-named actuating means, and an arm adapted to open said valve only upon completion of said peripheral movement of said tire-stripping members.

15. In a tire-stripping machine the combination of means to clamp a core, tire stripping members, and means to move said members radially of the core and peripherally of the core, fluid actuated devices for clamping said core and for moving the stripping members radially and peripherally of the core, a source of fluid pressure, a series of valves between said source of pressure and said devices, and arms carried on the moving parts of said machine to operate said valves.

CHARLES W. STEELE.